March 11, 1930.  A. KALO  1,749,944

PIPE COUPLING

Filed Aug. 16, 1928

Inventor
Albert Kalo
By W. S. McDowell
Attorney

Patented Mar. 11, 1930

1,749,944

UNITED STATES PATENT OFFICE

ALBERT KALO, OF COLUMBUS, OHIO, ASSIGNOR OF ONE-HALF TO JOSEPH D. COX, OF COLUMBUS, OHIO

PIPE COUPLING

Application filed August 16, 1928. Serial No. 299,938.

This invention relates to improvements in pipe couplings, and has particular reference to pipe couplings of the type employed in connection with steam lines or other conduits which carry fluids under conditions of abnormal pressures or temperatures, it being the primary object of the invention to provide a coupling which when operatively applied to the meeting ends of a pair of communicating conduits, will serve to securely unite and seal said meeting ends for the purpose of providing a strong, durable mechanical connection between the conduits and at the same time provide an efficient seal by which the escape of fluids through the coupling will be effectually precluded.

It is another object of the invention to provide a pipe coupling of the character set forth by means of which the coupling may be readily applied to the registering ends of a pair of conduit sections, this being accomplished in a convenient and labor saving manner irrespective of the wide variety of positions which the communicating conduit sections may assume in actual practice.

It is a further object of the invention to provide a coupling wherein a double seal is provided to prevent the escape of fluids between the joints provided by the registering ends of the conduit sections, said seals being of an all-metallic construction and preferably devoid of compressible materials.

With these and other objects in view which will appear as the description proceeds, the invention consists in the novel features of construction, combination of elements and arrangement of parts hereinafter to be fully described and pointed out in the appended claim.

Figure 1:
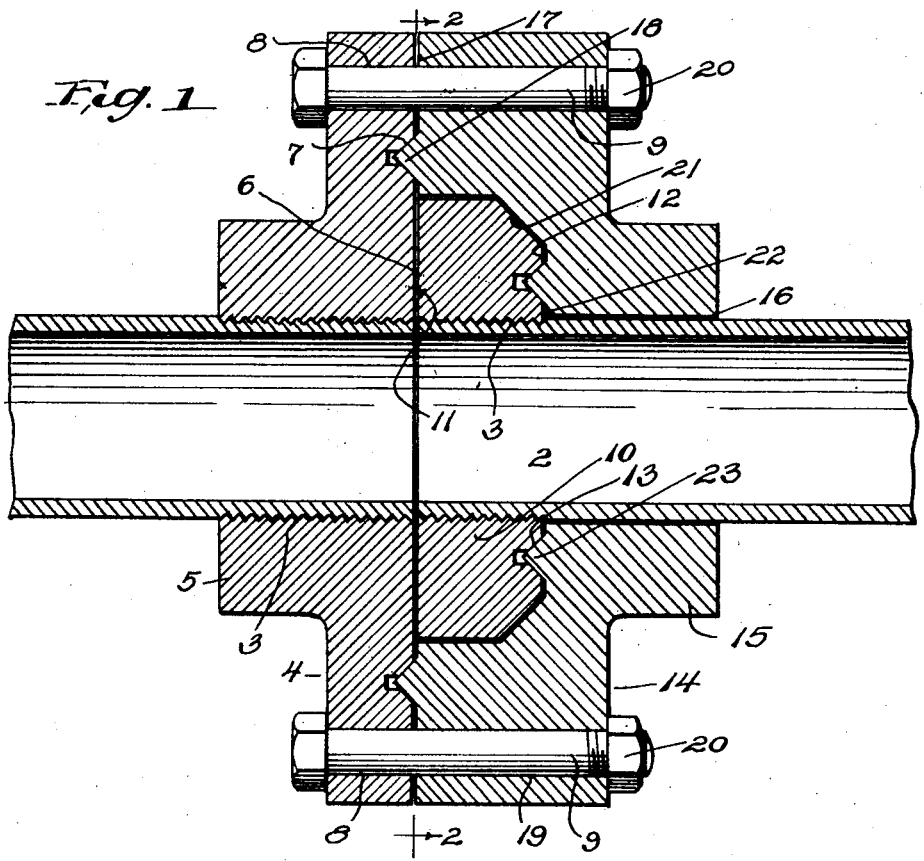
Figure 2:
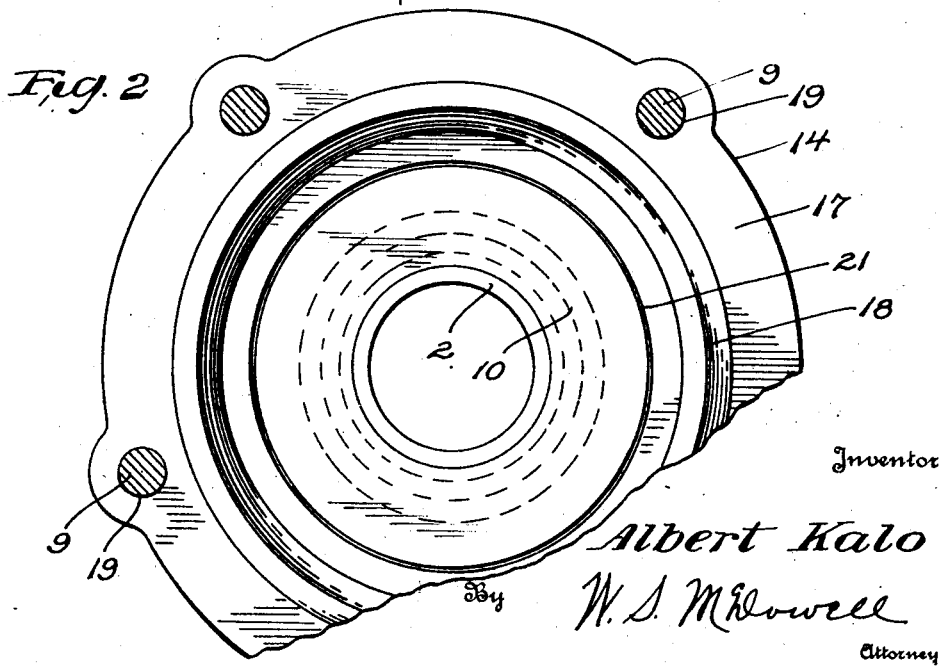

In the accompanying drawing:

Figure 1 is a vertical sectional view taken through a pair of registering conduit sections provided with the improved method comprising the present invention, Figure 2 is a vertical sectional view, the plane of which being disclosed by the line 2—2 of Figure 1.

Referring more particularly to the drawings, a pair of registering pipe sections have been indicated by the numerals 1 and 2, which sections have their adjoining ends slightly spaced and the sections are externally threaded at the ends thereof for a suitable longitudinal distance, the threads being indicated by the numeral 3. Mounted upon the threads of the pipe section 1 is a coupling head 4 provided with an axial hub 5 which is internally threaded for the reception of the threads 3. The head 4 includes a flat vertically disposed wall 6, which wall is provided with a circular, substantially V shaped groove 7, disposed concentrically about the axis of the pipe section 1. Contiguous to the periphery of the head, the latter is provided with a plurality of circularly arranged and circumferentially placed openings 8, which are adapted for the reception of clamping bolts 9, to be hereinafter more fully described.

Mounted upon the threaded end of the pipe section 2 is an internally threaded nut 10, the latter being formed with a flat vertical wall 11 which registers with the wall 6 of the head 4. The opposite side of the nut or collar 10 includes a substantially flat vertical wall 12, which is formed to include an annular groove 13 which is also substantially V shaped in vertical cross-section, as shown in Figure 1. The nut or collar 10 is threaded upon the pipe section 2 so as to occupy a fixed stationary position thereon, and, similarly, the head 4 is threaded on the pipe section 1 to occupy a fixed stationary position, its wall 6 being arranged in substantially the vertical plane defining the end of the section 1, and the wall 11 of the nut or collar 10 all preferably arranged to align with the vertical end portion of the pipe section 2.

Loosely mounted upon the end of the pipe section 2 is a movable clamping head 14. This head is also of metallic construction and includes a hub portion 15 provided with a bore 16 which possesses a diameter sufficiently large to permit the movable head to slide freely lengthwise of the pipe section 2. The head 14 is of circular formation and includes a flat vertical wall 17 which registers ordinarily with the wall 11 of the nut 10 and in complemental relationship with the wall 6 of the stationary head 4. The wall 17 is provided with a circular substantially V shaped rib 18, which is adapted to enter the groove 7 in the head 4 for the purpose of producing a tight fluid seal to prevent the escape of a fluid from the pipe sections and through the joints of the coupling. It will be observed that the bolts 9 pass through longitudinal openings 19 provided near the peripheral portion of the head 14, and that the outer ends of said bolts are threaded for the accommodation of nuts 20 which, upon being tightened, admit of relative approach between the stationary and movable heads so that the circular rib 18 will be forced into tight sealing engagement with the walls of the groove 7.

The hub portion of the head 14 at one end is provided with an enlarged socket 21, adapted for the reception of the nut or collar 10, the depth and construction of the socket being such that the wall 11 of the nut 10 will register with the wall 17 of the head 14 when the coupling occupies its operative position in connection with the pipe sections.

To prevent the seepage of fluid between the joints or crevices existing between the outer walls of the collar or nut 10 and the walls of the socket 21, the inner vertical wall 22 of said socket is formed with a V-shaped rib 23, which enters the groove 13 formed in the wall 12 of the nut or collar when the coupling is assembled. This arrangement produces what may be termed a "double seal" so that all crevices or meeting faces of the coupling are effectively closed or united to prevent uncontrolled escape of a fluid from the pipe sections.

In view of the foregoing it will be seen that the present invention provides a simple yet efficient type of pipe coupling which provides for a secure and substantial mechanical connection between the meeting ends of a pair of fluid conveying conduit sections and that, further, the coupling is so formed that without the use of packing or other compressible materials fluid tight seals are established to prevent the escape of the fluids conveyed by the conduit sections through the coupling. The coupling has the advantage of simplicity in application in that it may be readily applied to a pair of conduit sections while the latter are being erected or placed in fluid conveying relationship. Furthermore, when repairs or replacements in the fluid line are made, the meeting faces of the coupling sections may be readily cleaned of dirt, grit or foreign matters so that when again assembled the coupling sections will produce the same effective seal as they did when first erected.

It will be understood that the coupling sections may be formed from any suitable materials and that the proportions thereof may vary to meet the demands of the service to which they are placed. I, therefore, do not limit myself to the precise details of construction and arrangements above set forth and shown in the accompanying drawing, but reserve the right to employ such variations and modifications thereof without departing from the scope or spirit of the invention as the latter is set forth in the following claim.

What is claimed is:

The combination with a pair of registering pipe sections, a stationary head threadedly mounted upon one end of one of said pipe sections, a collar threadedly mounted upon the complemental end of the other of said pipe sections, a movable head slidably mounted upon said last named pipe section, a circular rib provided upon one of said heads and receivable within a circular groove formed in the other of said heads, a corresponding rib and groove construction between said movable head and said collar, and clamping means for maintaining said heads in stationary clamped and secured relationship.

In testimony whereof I affix my signature.

ALBERT KALO.